United States Patent
Kanai et al.

(10) Patent No.: US 6,867,875 B1
(45) Date of Patent: Mar. 15, 2005

(54) METHOD AND APPARATUS FOR SIMPLIFYING FAX TRANSMISSIONS USING USER-CIRCLED REGION DETECTION

(75) Inventors: Junichi Kanai, East Windsor, NJ (US); Terry J. Nelson, New Providence, NJ (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/456,041

(22) Filed: Dec. 6, 1999

(51) Int. Cl.[7] ............................ G06F 15/00; H04N 1/40; G06K 9/34
(52) U.S. Cl. ...................... 358/1.15; 358/447; 382/175; 382/177
(58) Field of Search ................................ 358/447, 1.15; 382/317, 181, 176, 177, 185, 186–190, 175, 203, 306, 159

(56) References Cited

U.S. PATENT DOCUMENTS

| | | |
|---|---|---|
| 5,048,099 A | 9/1991 | Lee |
| 5,201,011 A | 4/1993 | Bloomberg et al. |
| 5,579,407 A | 11/1996 | Murez |
| 5,619,592 A * | 4/1997 | Bloomberg et al. ......... 382/175 |
| 5,663,808 A | 9/1997 | Park |
| 5,666,549 A | 9/1997 | Tsuchiya et al. |
| 5,680,470 A | 10/1997 | Moussa et al. |
| 5,848,413 A | 12/1998 | Wolff |
| 5,873,077 A | 2/1999 | Kanoh et al. |
| 5,875,038 A | 2/1999 | Gerber |
| 6,351,559 B1 | 2/2002 | Zhou et al. |
| 6,512,848 B2 * | 1/2003 | Wang et al. ................. 382/176 |
| 6,625,642 B1 * | 9/2003 | Naylor et al. ............... 709/206 |

FOREIGN PATENT DOCUMENTS

| | | |
|---|---|---|
| DE | 4013326 A1 | 4/1990 |
| DE | 4319472 A1 | 6/1994 |
| FR | 2627921 | 9/1989 |
| NL | 9000283 | 9/1991 |

OTHER PUBLICATIONS

Tarjan, Robert, Depth–First Search and Linear Graph Algorithms, Siam Journal on Computing, Jun. 1972, pp. 146–160.
Theo Pavlidis, Algorithms for Graphics and Image Processing, Computer Science Press., 1982, p. 1–3.
Aho et al., The Design and Analysis of Computer Algorithms, pp. 179–187.
Aho et al., Data Structures and Algorithms, Jun. 1983, pp. 244–246, 252, 417.
http://www.rightfax.com/Products/ocr.htl, printed Aug. 17, 1998.
http://www.panasonic.co.jp/mgcs/fax/dx1000/dx1000.html, printed Jul. 12, 1999.
http://www.copiers–phones.com/cleveland/copiers/ifax/internet–fax.htm, printed Jul. 26, 1999.
Dr. Dobb's Essential Books on Graphic & Programming, Dr. Dobb's Journal, Miller Freeman, Inc., 1995.

* cited by examiner

Primary Examiner—Kimberly Williams
Assistant Examiner—Saeid Ebrahimi
(74) Attorney, Agent, or Firm—Harness, Dickey & Pierce, PLC

(57) ABSTRACT

The user circles the fax number or name of the receiving party and the system then uses the circled number or name to dial the receiving party's fax machine to initiate the transmission. The system scans the first page or cover page of the document to be faxed and uses a computer-implemented algorithm to detect the user-circled region. The image within the user-circled region is then extracted and optical character recognition performed to ascertain the fax number. Alternatively, the user-circled region may contain a name or other information to access a database where the fax number is stored.

34 Claims, 9 Drawing Sheets

METHOD AND APPARATUS FOR SIMPLIFYING FAX TRANSMISSIONS USING USER-CIRCLED REGION DETECTION

BACKGROUND AND SUMMARY OF THE INVENTION

The present invention relates generally to facsimile transmission equipment and scanned image text processing. More particularly, the invention relates to a system for entry and verification of the recipient's fax number using user-circled region detection.

When sending a facsimile or fax it is common practice to include a cover sheet or transmittal sheet that contains the name of the recipient, the name of the author, the number of pages being transmitted and other useful routing information. It is quite common to include the recipient's fax number on the cover sheet, so that the sender will have a record of the fax transmission and the number to which the fax transmission was sent.

In many offices, multiple users share a common fax machine. Thus the document to be faxed and the associated fax transmittal cover sheet are typically prepared at the document preparer's work station and then taken to the fax machine where the documents are placed, face-down, on the input tray of the fax machine. The sender must, of course, enter the recipient's fax number by keying it in through the dial-pad buttons provided on the fax machine.

The problem with this conventional fax-sending technique is that the fax cover sheet ends up face-down on the input tray, where the recipient's fax number, printed or typed on the first page or cover sheet, is no longer visible. Thus the sender must first write the number down on a scratch pad before placing the document on the input tray. This intermediate scratch pad step makes the entire process less efficient and introduces the possibility of fax number transcription errors.

The present invention solves the problem through a document image analysis system that identifies the recipient's fax number on the facsimile transmittal cover sheet or first page of the document and then enters the identified number directly into the dialer of the fax machine. More specifically, the system incorporates a document image analysis system that identifies user-circled regions within the digitized image of the first page or transmittal sheet. The system performs optical character recognition on the user-circled region (i.e., the recipient's fax number) and places the recognized digits in the memory of the fax machine's dialer module.

The system includes an interactive confirmation system to allow the sender to verify that the entered number is correct. The preferred embodiment employs multi-modal verification in the form of on-screen alphanumeric display and synthesized speech.

While user-circled fax numbers serve as the most common form of input, the system can also be used to recognize user-circled recipient names, which are then looked up in a database of stored fax numbers within the fax machine.

The system is quite easy to use, because all the sender must do is circle the recipient's fax number or name on the cover sheet and the system does the rest. The user-circled region extraction process is quite robust and will correctly identify the location of the fax number or name even if the sender does not draw a fully-closed circle.

For a more complete understanding of the invention, its objects and advantages, refer to the following specification and to the accompanying drawings.

BRIEF DESCRIPTION OF THE DRAWINGS

FIG. 1 shows the typical face-down placement of the document to be faxed;

DESCRIPTION OF THE PREFERRED EMBODIMENT

Figure 1:
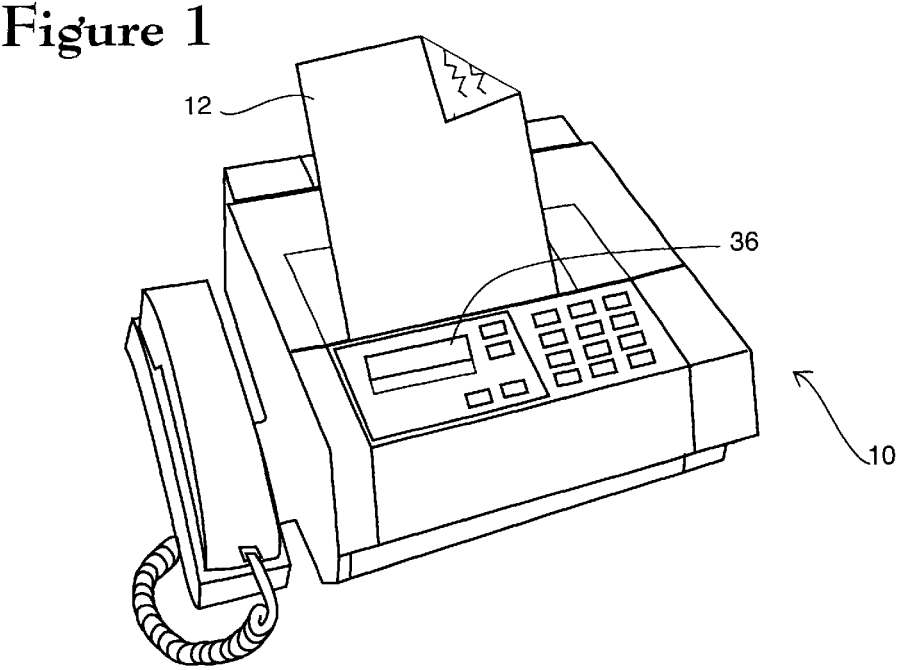
FIG. 1 is an exemplary view of a facsimile machine into which the system of the invention can be incorporated.

The system and method of the invention may be implemented in a variety of different facsimile transmission systems, including the desktop fax machine illustrated in FIG. 1 at 10. The document to be sent is placed in the machine as at 12. Note that in a typical fax machine of this type the document is placed face-down, so that the writing is not readily visible as the document is being fed through the machine.

Figure 2:
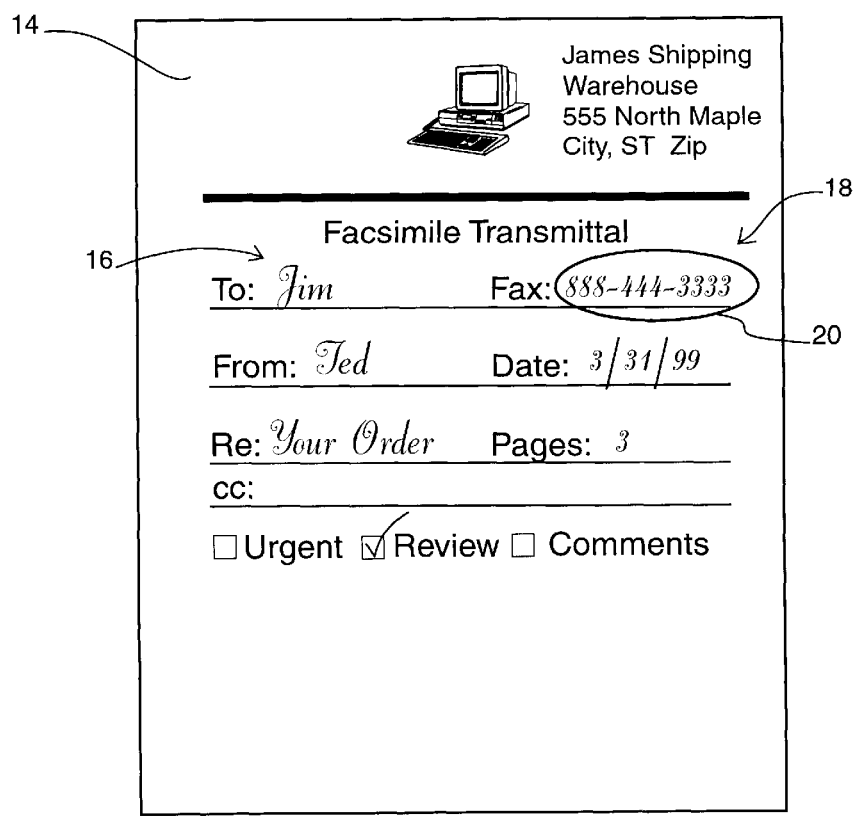
FIG. 2 is an exemplary facsimile transmittal cover sheet, showing a user-circled region.

An exemplary facsimile transmittal cover sheet 14 is shown in FIG. 2. Specifically, the cover sheet includes the recipient's name as at 16 and the recipient's fax number as at 18. As will be more fully described below, the document processing system of the invention processes text located within a user-circled region. A user-drawn circle is illustrated in FIG. 2 at 20, encircling fax number 18. As will be more fully explained, the system will also process alphanumeric text and symbols other than numeric digits by accessing the system's on-board database.

In the preferred embodiment, the text processing components that identify the user-circled region and subsequently process the information contained within the region are embedded in the fax machine operating system software. The preferred embodiment is implemented as software or computer programs that run on the fax machine's on-board processor. The processes employed to implement the invention are thus integrated with the processes provided by the fax machine to perform conventional facsimile transmission operations. FIG. 3 illustrates the principle components of the system.

Common to most fax machines is a set of basic fax machine processes 22, for controlling physical document through-put as well as integrating the scanner component, modem component, display component and printing component of the machine's hardware system. In FIG. 3 the fax machine processes that are specifically involved in the preferred implementation have been illustrated separately from the other fax machine processes 22. These processes include a module 24 for digitizing and storing at least the first page (e.g., transmittal cover sheet) for further processing by the user-circled region detection module 26.

Also involved in the preferred implementation is the dialer module 28. This module accesses a memory location that stores the fax number used by the modem's dialer to initiate a facsimile transmission. Conventionally the fax number to be dialed is placed into this memory location by user entry through the fax machine's numeric keypad. In addition to user-entry, the system uses its optical character recognition module 30, optional database 32, and number entry system 41 to load a fax number into memory based on information located within the user-circled region.

Specifically, the optical character recognition module 30 converts the scanned image data within the user-circled region into alphanumeric text or other character-based fonts or symbols. If numeric, the converted text or symbols are loaded directly into the dialer's memory. If non-numeric, the number entry system 40 uses the converted text or symbols to look up the corresponding fax number in database 32.

The optical character recognition module 30 generates a consonance value associated with each converted character. This information may be used to alert the user when one or more characters are not being reliably recognized. The system may alert the user by suitable display on the LCD display 36 (FIG. 1) or through a synthesized spoken message.

To efficiently handle any optical character recognition transcription errors (and also any keypad entry errors) the system includes a fax number confirmation module 34 that monitors the number stored in the dialer's fax number memory and provides an indication of that number on the LCD display 36 (FIG. 1) of the fax machine and also optionally as synthesized spoken digits using the system's text-to-speech engine 38. The text-to-speech engine 38 is particularly useful for number confirmation, because the user can hear the digits being read as he or she visually checks those digits appearing within the user-circled region 20 of the facsimile transmittal cover sheet 14 (FIG. 2).

Although the facsimile cover sheet was initially placed face-down on the input tray, the basic fax machine process 22 causes this sheet to be fed through the machine before the dialing process can begin. Thus the user is able to extract the cover sheet and read from it as the text-to-speech engine reads aloud the fax number as recognized by the optical character recognition module 30. If the fax number has been correctly entered, the user can press the transmit button 40 to cause the dialer 28 to dial the recipient's number.

The preferred embodiment is designed to work whether the user-circled region contains machine-printed or handwritten information. Thus the user may either machine-print or handprint the recipient's name, fax number (or E-mail address for an Internet fax) on the cover sheet or first page of the document to be sent. The first page may or may not be a cover sheet.

Figure 4:
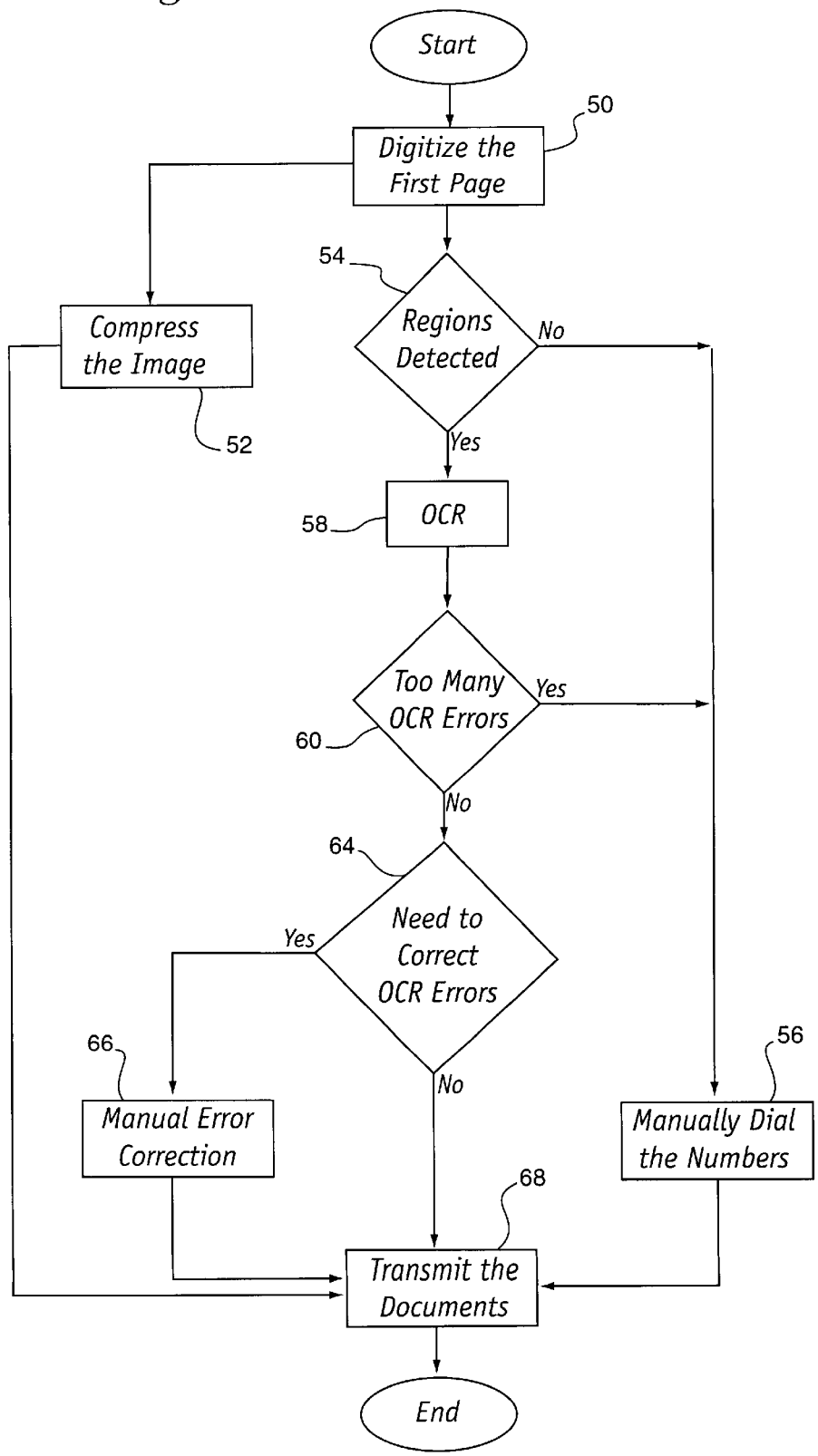
FIG. 4 is a flowchart diagram illustrating the method of the invention where the user-circled region is a fax number.
Figure 5:
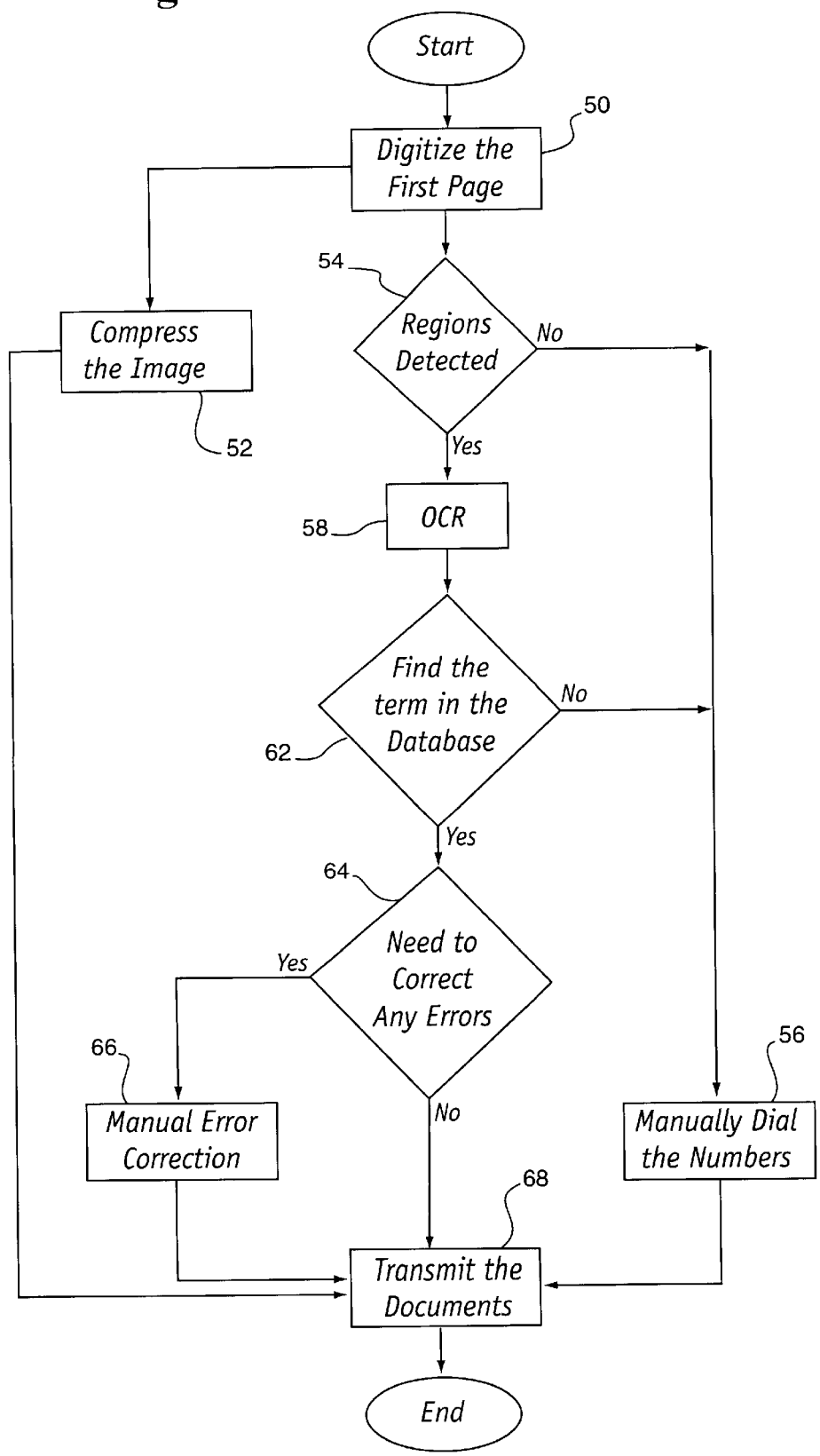
FIG. 5 is a flowchart illustrating the method of the invention where the user-circled region is a term accessed through a database.

Referring to FIGS. 4 and 5, the operation of the preferred embodiment will now be explained. FIG. 4 illustrates the process where the user-circled region contains a fax number. FIG. 5 illustrates the process where the user-circled region contains other information for accessing the database 32. The procedures of FIGS. 4 and 5 both begin by digitizing the first page of the document as indicated at step 50. Preferably, the image is compressed and stored in memory for later transmission. The stored image is used as the basis for subsequent user-circled region detection and optical-character recognition processing. The compression is illustrated at 52 in FIGS. 4 and 5.

Next, the user-circled region detection module 26 is called to determine whether the user has drawn a circle and if so to extract the digitized bitmapped data contained within the circle. The region detection step is illustrated at 54 in FIGS. 4 and 5. If no user-circled region is detected, system operation proceeds to step 56 where the user must manually dial the fax number.

If a user-circled region is detected, the information contained within the circled region is processed by optical character recognition module 30 as depicted at step 58. The optical character recognition module returns a character label and a corresponding confidence value for each input symbol. The confidence values indicate the reliability of the recognition results. If the confidence values for one or more letters fall below a predetermined threshold, the preferred embodiment will abort the optical character recognition process as indicated at step 60 (FIG. 4) and operation will proceed to step 56 where the user must manually dial the fax number. Thus a predetermined number of OCR errors causes the system to default to a manual keypad entry mode.

In a similar fashion, where the input information is a name to be looked up in database 32, the system will default to manual keypad entry mode if the name is not found in the database. This decision is illustrated at step 62 in FIG. 5.

In some instances the optical character recognition module may provide high confidence digits for some, but not all of the numbers. Rather than default to manual mode, the system branches at step 64 to a manual error correction mode 66, allowing the user to correct any erroneously-entered digits. Correction can be performed by using the digit keys on the keypad, and by using the provided navigation keys: left arrow (move left), right arrow (move right), delete and insert. If desired, the system can also be provided with "HOME" and "END" keys which cause the manual error correction cursor to jump to the beginning and end of the entered number, respectively. If one or more fax numbers need to be recognized, additional keys: up arrow (jump to previous number) and down arrow (jump to next number) may also be provided.

Figure 3A:
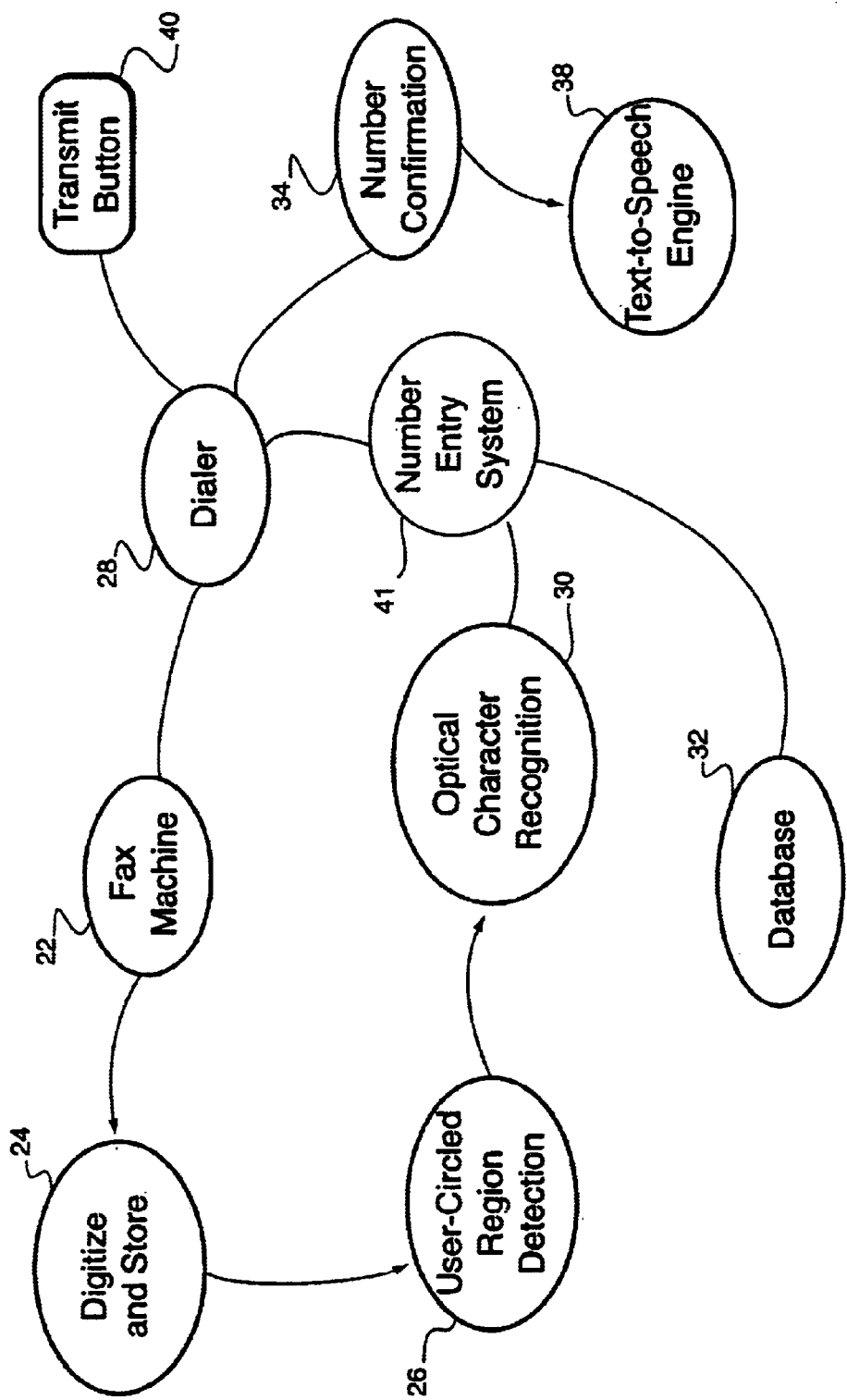
FIG. 3a is an entity relationship diagram illustrating the relationship among key components of a first embodiment of the system.
Figure 3B:
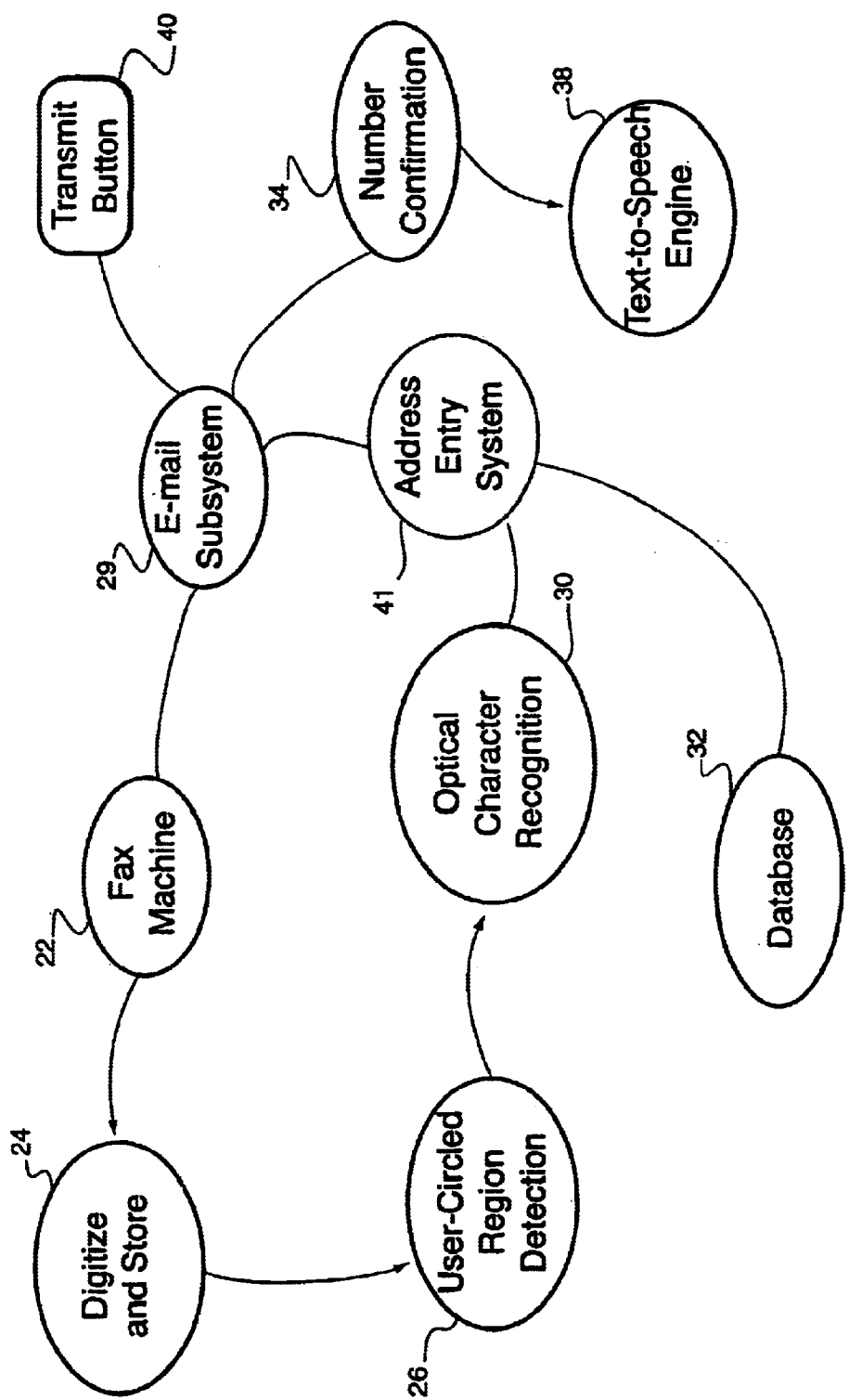
FIG. 3b is an entity relationship diagram illustrating the relationship among key components of a second embodiment of the system.

The error correction testing step 64, operates in conjunction with the number confirmation module 34 and the associated text-to-speech engine 38 (FIGS. 3a and b). The number—as recognized—is displayed on the LCD display 36 of the fax machine and is also optionally spoken through the text-to-speech engine 38. The user simply compares the displayed and/or spoken number with that of the fax cover sheet or first page of the document. If the numbers match, the user presses the transmit button, causing the system to transmit the fax document as indicated at step 68. If any errors are detected, the user uses the aforementioned navigation keys to highlight and correct the incorrectly-entered digits.

A variation on the above-described fax machine is the Internet fax machine. The Internet fax machine resembles a standard fax machine except that it scans the input pages and formulates the scanned image as an E-mail attachment. The Internet fax machine then sends the scanned document over the Internet as an attachment to an E-mail message generated by the fax machine. Instead of dialing the recipient's fax telephone number, the Internet fax machine sends the document to the recipient's E-mail address.

In a conventional Internet fax machine, the E-mail address may be entered through a keypad or keyboard as a sequence of alphanumeric characters.

In accordance with the invention, the user circles the recipient's E-mail address appearing in one of the pages being transmitted. The system identifies the circled region, as more fully discussed herein, and extracts the recipient's E-mail address from the circled region. Optical character recognition is used to convert the circled E-mail address into alphanumeric characters representing the recipient's E-mail address. If a recipient's name registered in the database 32 is detected, the address entry system 43 uses the corresponding E-mail address. These characters are then supplied to the fax machine's Internet communication module. The Internet communication module may be associated with the E-mail subsystem 29 (FIG. 3b) of the fax machine. The E-mail subsystem 29 connects to the Internet through a suitable Internet service provider and the associated Internet access software logs onto the service provider and establishes a suitable connection for communicating E-mail traffic. The fax machine then formulates an E-mail message, which can be a predetermined transmittal message to which the file containing the scanned image of the document to be sent is attached. The recipient's E-mail address, identified by optical character recognition, is used to address the E-mail message.

DESCRIPTION OF A FIRST USER-CIRCLED REGION DETECTION ALGORITHM

Figure 6:
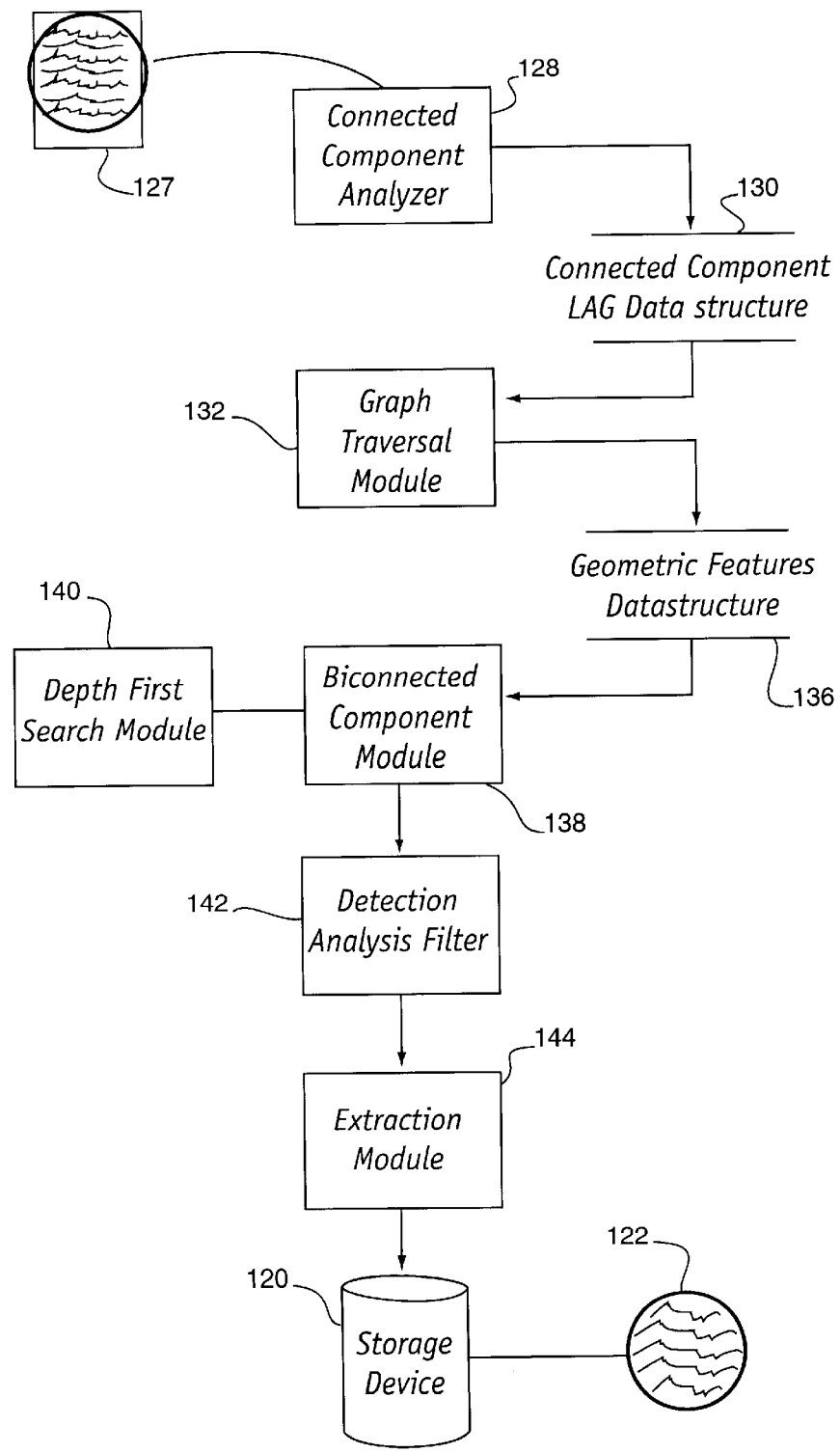
FIG. 6 is a software block diagram illustrating a first connected-component analysis technique.

Referring to FIG. 6, a software block diagram of the system is illustrated. The functional blocks illustrated in FIG. 6 are embodied in and operated by the processor of the computer system. The computer-implemented software system employs a group of processing modules, each designed to perform different data manipulation functions. These processing modules have been illustrated by enclosed rectangles. The data structures have been illustrated using open-ended rectangles, to distinguish them from the processing modules. Also, to aid in understanding the invention, the processing modules of the invention have been arranged in a top-down order, showing the sequence in which various modules are placed in service.

First, the connected-component analysis is performed by an analyzer 128 upon the bitmap image data of the first page as stored in memory. A connected component in a binary image is a maximal set of touching black pixels. Essentially, the connected-component extraction process starts with a given data element within the bitmap image data of the page and analyzes the adjacent data elements to determine whether they comprise part of a connected component. For example, the black dots that form the letter "A" or a user-drawn circle are all connected and thus comprise a connected component.

In the preferred embodiment the connected-component analysis is performed in a raster-scan fashion whereby contiguous black pixels in the same horizontal line are created and treated as a single unit called a segment. A line-adjacency graph algorithm is then used to represent the segments produced by the connected-component analyzer 128 in a line-adjacency graph that is to be stored in a connected-component LAG data structure 130.

Figure 7A:
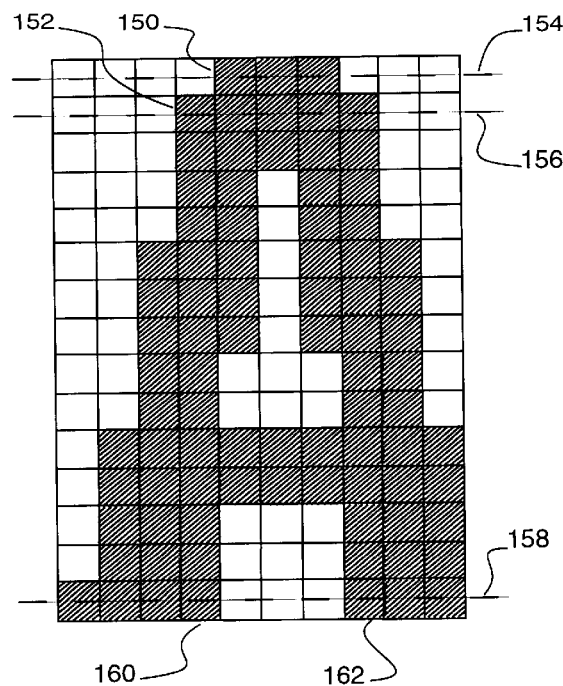
FIGS. 7a–7b illustrate how the connected components are converted into line-adjacency graphs.
Figure 7B:
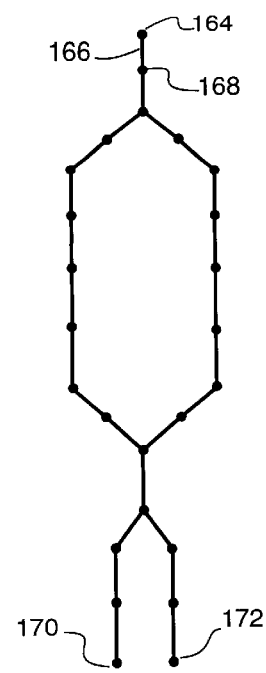

FIGS. 7a and 7b illustrate how a connected component from a bitmap image is converted into a line-adjacency graph for storage in the connected-component LAG data structure 130. The overlapping black segments at the top of the connected component shown in FIG. 7a have corresponding representations in the line-adjacency graph shown in FIG. 7b. Each black segment is represented as a node in the line-adjacency graph. For example, the connected component shown in FIG. 7a contains a segment 150 along scan line 154 which is represented as a node 164 in the corresponding line-adjacency graph that is shown in FIG. 7a. Likewise, segment 152 along scan line 156 is represented as node 168. Scan lines 154 and 156 are adjacent in the image. If two or more black segments are adjacent in the vertical plane, that adjacency is represented as an edge in the line-adjacency graph. For example, the segments 150 and 152 are adjacent in the vertical plane, therefore the corresponding nodes 164 and 168 are joined by a line 166 in the corresponding line-adjacency graph. Segments that are separated in the horizontal plane are also separated in the line-adjacency graph of the connecting component. For example, the black segments 160 and 162 are separated by a space along the scan line 158. The corresponding nodes 170 and 172 corresponding to segments 160 and 162 are also separated in the graph.

Figure 8:
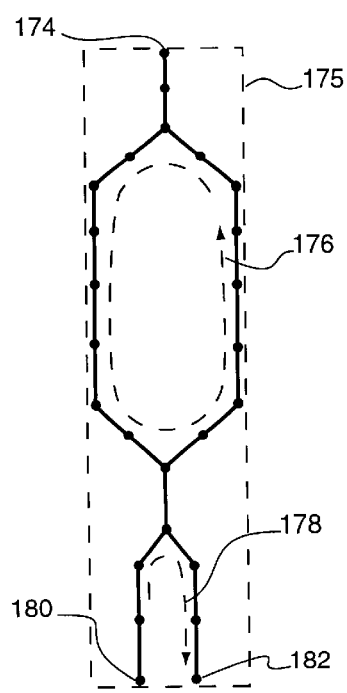
FIG. 8 illustrates various features of the connected component.

After the connected-component LAG data structure 130 has been populated by the connected-component analyzer 128, a graph traversal module 132 is then called upon to extract certain geometric features from each connected-component and store them in a geometric features data structure 136. FIG. 8 illustrates various geometric features of a connected component which include the width and height of a bounding box 175 where the bounding box 175 is defined as the smallest rectangle that can encompass the connected component. Further geometric features include the area of the bounding box 175, number of holes 176, the number of upward and downward arcs 178, the number of downward ends 180 and 182, the number of upward ends 174, and various other geometric features.

After the geometric features data structure 136 has been populated, a bi-connected-component module 138 is used to separate all bi-connected components from the rest of the image content. The bi-connected-component module 138 accesses the connected-component LAG data structure 130 to analyze each line-adjacency graph of a connected component for bi-connected components.

Figure 9A:
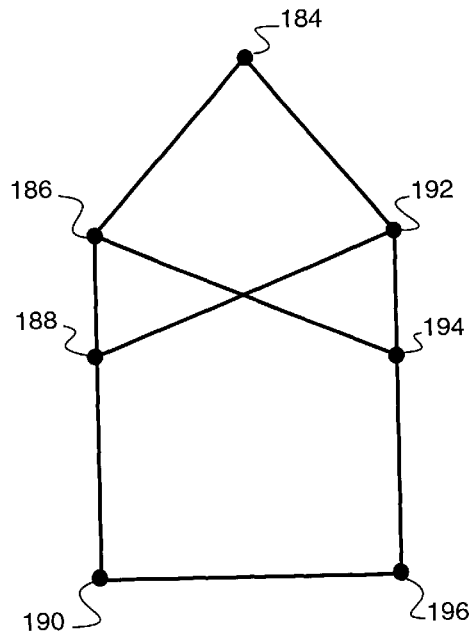
FIGS. 9a–9c are further illustrations of line-adjacency graphs, useful in understanding node removal.
Figure 9B:
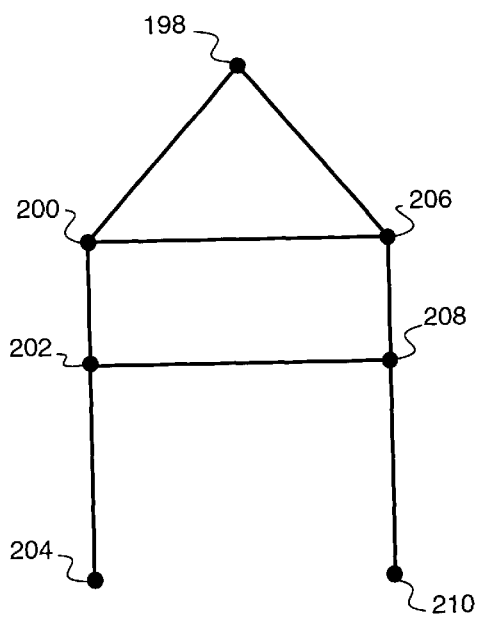
Figure 9C:
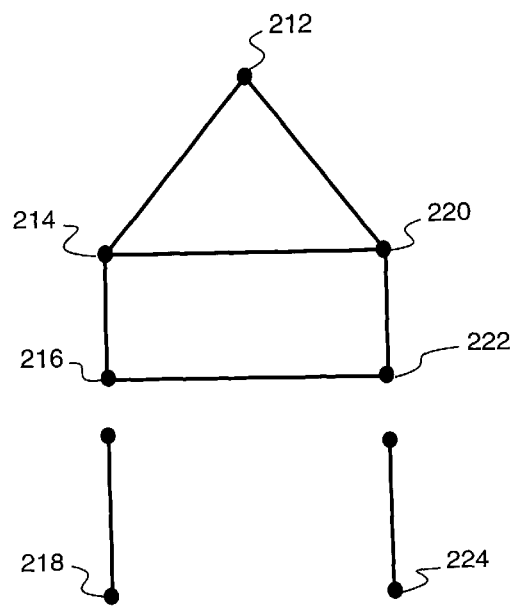

A line-adjacency graph connected component is defined as bi-connected if the removal of any of its nodes does not break the graph into disconnected sub-graphs. FIG. 9b illustrates a non-bi-connected graph where disconnecting nodes 202 and 208, would yield separate connected components having three sub-graphs, as shown in FIG. 9c. FIG. 9a shows a bi-connected component where the removal of any one of the nodes 184, 186, 188, 190, 192, 194, and 196 will not break the graph into separate sub-graphs. A graph may contain several bi-connected components. A bi-connected component is, by definition, the largest sub-graph that is bi-connected. Thus the system decomposes a line adjacent graph into its bi-connected components. For example, the connected component that contains the nodes 184, 186, 188, 190, 192, 194, and 196 is a bi-connected component.

In the preferred embodiment of the invention, the bi-connected-component module 138 utilizes a depth-first search module 140 for determining the amount and size of the bi-connected-component sub-graphs from the graph. The module 140 first initializes all nodes of the graph as being unvisited. Processing of the graph starts from an arbitrary node known as the root node. Each node is processed when it is first discovered. Once a node is processed a bit is then set, thereby indicating that the particular node has been visited. The adjacent nodes that are connected to the node being processed are scanned to determine if they have been processed. Each time an unvisited node is discovered, it is processed recursively by the algorithm. After a node's adjacent neighbors have been processed, the algorithm returns to the previous node until it has returned to the root node and processed all nodes that are connected to that root node. Then the next unprocessed node in the graph is chosen as a root node and the same procedure is repeated again until every node in the entire graph has been visited. The information associated with each node is utilized to determine the largest bi-connected component of the line-adjacency graph.

A detection-analysis filter 142 supplies the functionality needed to reduce the false detection of user-enclosed regions after the bi-connected-component module 38 has processed the line-adjacency graphs of the connected component from the connected-component LAG data structure 130. For example, false bi-connected components may include a large print character like the letter "o", a part of a photographic element that contains many holes, or graphic elements that contain holes. The above mentioned examples must be distinguished from the user-enclosed region. In order to reduce the false detection of user-enclosed circles in the presently preferred embodiment, a number of heuristics are employed to distinguish the user-enclosed region from bi-connected components that are not user-enclosed.

The first heuristic is a minimum size detector. The minimum size detector compares the bounding box 175 of all the bi-connected components that have been found by the bi-connected-component module 138 to a predetermined size. Since characters that contain holes can be considered as connected components, and the characters are relatively small when compared with a typical user-enclosed region, a minimum size threshold is set for bi-connected components to be considered as a user-enclosed region. If either the width or height of a biconnected component is not greater than the minimum size threshold then that particular biconnected component is discarded as a possible non-user-enclosed region.

Another heuristic is a rectangle frame detector. In most newspaper and magazine articles, a rectangle frame encloses text, photographs and graphics. The bi-connected component module will consider a rectangle frame a bi-connected component. The rectangle frame detector eliminates such bi-connected components from further consideration. The rectangle frame detector utilizes the fact that a rectangle has two parallel sides while the user-enclosed region will not have parallel sides. The rectangle frame detector calculates the distance from the left most pixel of a bi-connected component to its right most pixel along each scan line. The average distance and the standard deviation of all the scan lines is calculated. If the standard deviation is larger than a given threshold, then the bi-connected component is considered a user-enclosed region candidate. In the preferred embodiment the threshold is set at 10% of the average distance. The bi-connected component that has a given standard deviation less than a predetermined threshold is discarded.

A third heuristic, a photograph element detector distinguishes a photographic region from a user-enclosed region. A photographic region typically has a much higher black-pixel density than the area that is user-enclosed. The photograph element detector calculates the percentage of black pixels in the bounding box 175. In the preferred embodiment of the invention the threshold percentage is calculated as 40%. If the pixel density is higher than 40% the bi-connected component is discarded from the list of user-enclosed regions.

An extraction module 144 extracts the image component enclosed by each user drawn enclosure. The extraction module 144 performs the extraction by identifying the leftmost black pixel and the rightmost black pixel on each scan line. The region bounded by the leftmost and rightmost black pixels is the user-enclosed region and is extracted. In the preferred embodiment, the extracted region is stored in system memory.

DESCRIPTION OF A SECOND USER-CIRCLED REGION DETECTION ALGORITHM

Use of line-adjacency graphs as described in the preceding section will detect user-drawn circles, provided the circle is a closed-loop without any gaps. In this section we present an alternate, presently-preferred algorithm for detecting user-circled regions that will work when the circle has breaks or gaps. Based on contour analysis, this presently-preferred algorithm will detect user-circled regions even when the circle has gaps due to unevenness of pen stroke or failure by the user to draw a fully closed circle.

Figure 10:
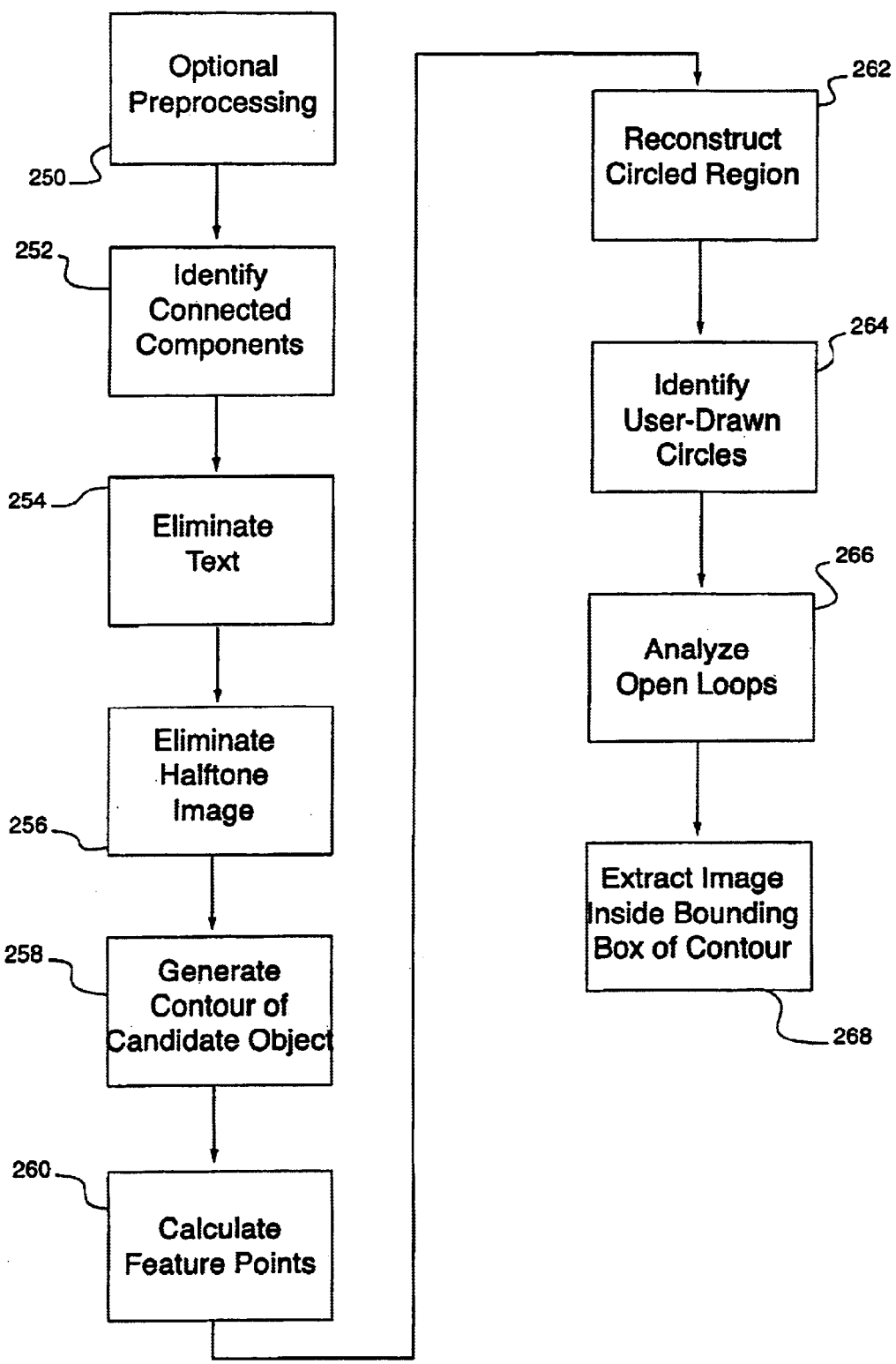
FIG. 10 illustrates a second contour analysis technique.

The presently-preferred contour analysis technique is illustrated in FIG. 10. The technique is based on identifying the contour of a candidate object. The candidate object may include user-drawn circles, machine printed frames or other non-text materials on the page. By analyzing the contour using a feature extraction module, the algorithm extracts the user-drawn circle. The contour is represented by a sequence of points with different curvature values. This makes it possible to distinguish a user-drawn circle from a machine-printed frame through a post processing analytical technique.

Connected components within a given page are found at step 252. In this step the image is scanned line-by-line and each pixel is labeled if it is connected with its neighboring pixels. After labeling the pixels for connectivity, a bounding box is calculated for each connected component. These bounding boxes are used to extract the candidate area in the image.

Next (at step 254) connected components representing text are eliminated. This is accomplished by analyzing the size of the bounding box and eliminating those connected components that have bounding boxes below a predetermined size.

Next, halftone images are eliminated at step 256. Halftone images compose large connected components. The algorithm detects halftone images by assessing the black-to-white pixel ratio within the bounding box associated with the connected component in question. Halftone images tend to have more black pixels than areas containing text.

Next, the user-drawn circle is identified by examining different candidate areas on the page. The first step in this procedure, depicted at 258, involves generating the contour of the candidate object. This is performed by tracing the outline of the object. The contour is represented in computer memory as an ordered set of points (coordinates of the boundary pixels). The tracing scheme first scans for the starting point (a border pixel that is not previously traced). Then the trace starts in a clockwise direction along the convex outline of the object. When the trace goes back to the starting point, or to a point where no more black pixels can be found around the current one, the trace stops and the scanning process to find the next starting point continues.

Next the contours obtained during step 258 are analyzed by calculating feature points associated with each contour (step 260). Contours obtained from step 258 can be closed curves or broken curves, due to noise in the image. Feature points are defined as high curvature points, including junctions of circles with other objects. Curvature can be calculated using re-sampling techniques, however this may not be reliable when noise is generated during the digitization process. By observation, the feature points can be detected approximately at either the local maxima or local minima on the x and y directions, even though not all maxima and minima are feature points. In the preferred implementation the starting point and ending point of each contour are treated as feature points.

After feature points have been identified, the circled region is reconstructed using the feature points. This is illustrated at step 262. In essence, each contour generated at step 258 is broken into segments at the feature points. These segments are examined and reconnected such that segments belonging to different objects are separated and those belonging to the same object are connected.

The main criterion for reconnecting the contour segments is to check the smoothness when making the transition between neighboring segments. For each contour segment, a small area around its starting and ending points is examined. The points on the two ends are fitted into lines so that the slope (angles coming and going out of the segment) can be estimated. These estimated angles are used to assess whether two line segments are approaching one another such that they should be connected as belonging to the same contour or are crossing one another such that they belong to unrelated contours.

Using the circles reconstructed at step 262, the user-drawn circles are identified at step 264 through a series of tests. The first test is based on the size of the contour as well as the area the contour covers. If the length of the contour exceeds a predetermined threshold and the bounding box of the contour covers a predetermined area, the algorithm considers the contour to be a user-drawn circle.

However, in order to discriminate between user-drawn circles and machine-printed frames, such as rectangular frames, machine-printed circles or tables, the smoothness of the connected contour is examined. One way to measure smoothness is to calculate the average curvature along the connected contour. If smoothness exceeds a predetermined threshold, the contour is considered to be machine-printed.

Because the algorithm reconstructs circled regions from the calculated feature points, it is able to identify user-drawn circles even if they contain small gaps or breaks. If desired, the user-drawn circle candidates can be further evaluated to determine if any gaps are sufficiently large to warrant rejection as user-drawn circles. The analysis (depicted at step 266) involves assessing the distant between the starting point and ending point of a contour. Distance can be assessed in a variety of different ways.

One technique for assessing distance is to determine whether one end point is within a predetermined radial distance from the other end point. We refer to this as a circular distance function. Another technique is to define a square bounding box of predetermined size around one end point and to determine whether the other end point is within that bounding box. We refer to this as the square distance function. A third technique is to define a square bounding box of predetermined size around one end point and then to rotate the bounding box around that end point to determine if at any rotational orientation the second end point falls within the bounding box. This will occur, if at all, when one corner of the bounding box lies on a line between the two end points. We call this the Manhattan distance function.

If the contour fails to pass any of the above tests, then it is considered to be an open arc, as opposed to a user-drawn circle. Once the user-drawn circle is identified as described above, the bounding box around its contour is used to delimit the region that will be extracted for subsequent optical character recognition analysis. This is illustrated at step 268. The image inside the bounding box of the contour is extracted and optical character recognition is performed on the extracted image to ascertain the fax number or name for database lookup. If no good circle is identified, the system can be configured to attempt to extract a fax number from within a "circle" previously rejected as an open arc or poorly drawn circle. The extracted number is presented to the user to confirm or correct, as described above.

From the foregoing it will be seen that the invention provides a useful, user friendly system for entering fax number information on a document. The user simply draws a circle around the fax number or name of the receiving party and the system does the rest.

While the invention has been described in its presently preferred embodiments, it will be understood that certain modifications can be made to these embodiments without departing from the spirit of the invention as set forth in the appended claims.

What is claimed is:

1. In a facsimile machine having a telephone dialer, the improvement comprising:

memory for storing a digitized image of at least a first page of a document to be faxed;

image analysis system for analyzing said digitized image to identify a user-circled region and for extracting a portion of said digitized image that lies generally within said identified user-circled region, said image analysis system includes a connected-component analysis system that identifies connected pixels of a predetermined tone and stores information about said connected pixels in a circled-region data-structure, said image analysis system adapted to recognize only the user circled region and ignore other circular shaped regions;

optical character recognition system for converting said extracted portion into characters; and number entry system for supplying a dialing number to said telephone dialer based on said characters.

2. The improvement of claim 1 wherein said number entry system includes database for storing records of predetermined numbers associated with predetermined names or words, and wherein said number entry system interacts with said database in supplying a dialing number to said telephone dialer.

3. The improvement of claim 1 wherein said optical character recognition system generates a confidence value associated with each converted character and wherein said improvement further comprising a confirmation system that alerts the user when a converted character has a low confidence value.

4. The improvement of claim 3 wherein said confirmation system includes a display for providing a visual indication that a converted character has a low confidence value.

5. The improvement of claim 3 wherein said confirmation system includes a speech generation system to provide an audible indication that a converted character has a low confidence value.

6. The improvement of claim 1 further comprising confirmation system that monitors said dialing number and provides an indication of that number to the user.

7. The improvement of claim 6 wherein said confirmation system includes a display for providing a visual indication of said dialing number.

8. The improvement of claim 6 wherein said confirmation system includes a speech generation system for providing a spoken indication of said dialing number.

9. The improvement of claim 1 wherein said image analysis system defines a line-adjacency graph stored in said circled-region data-structure and based on said connected pixels and further includes a feature extraction module to analyze said line-adjacency graph to identify said user-circled region, said image analysis system ignoring other circular shaped regions by applying at least one of the following techniques: minimum size detection, rectangle frame detector and photographic element detection.

10. The improvement of claim 1 wherein said image analysis system defines a candidate object contour stored in said circled-region data-structure and based on said connected pixels and further includes a feature extraction module to analyze said candidate object contour to identify said user-circled region, said image analysis system ignoring other circular shaped regions by applying at least one of the following techniques: size metric based elimination, half-tone based image elimination, circular distance function, square distance function and Manhattan distance function.

11. A facsimile machine comprising:
   a telephone dialer;
   a memory for storing a digitized image of at least a first page of a document to be faxed;
   image analysis system for analyzing said digitized image to identify a user-circled region and for extracting a portion of said digitized image that lies generally within said identified user-circled region, said image analysis system includes a connected-component analysis system that identifies connected pixels of a predetermined tone and stores information about said connected pixels in a circled-region data-structure, said image analysis system adapted to recognize only the user circled region and ignore other circular shaped regions;
   optical character recognition system for converting said extracted portion into characters; and
   number entry system for supplying a dialing number to said telephone dialer based on said characters.

12. The facsimile machine of claim 11 wherein said number entry system includes database for storing records of predetermined numbers associated with predetermined names or words, and wherein said number entry system interacts with said database in supplying a dialing number to said telephone dialer.

13. The facsimile machine of claim 11 wherein said optical character recognition system generates a confidence value associated with each converted character and wherein said facsimile machine further comprising a confirmation system that alerts the user when a converted character has a low confidence value.

14. The facsimile machine of claim 13 wherein said confirmation system includes a display for providing a visual indication that a converted character has a low confidence value.

15. The facsimile machine of claim 13 wherein said confirmation system includes a speech generation system to provide an audible indication that a converted character has a low confidence value.

16. The facsimile machine of claim 11 further comprising confirmation system that monitors said dialing number and provides an indication of that number to the user.

17. The facsimile machine of claim 16 wherein said confirmation system includes a display for providing a visual indication of said dialing number.

18. The facsimile machine of claim 16 wherein said confirmation system includes a speech generation system for providing a spoken indication of said dialing number.

19. The facsimile machine of claim 11 wherein said image analysis system defines a line-adjacency graph stored in said circled-region data-structure and based on said connected pixels and further includes a feature extraction module to analyze said line-adjacency graph to identify said user-circled region, said image analysis system ignoring other circular shaped regions by applying at least one of the following techniques: minimum size detection, rectangle frame detector and photographic element detection.

20. The facsimile machine of claim 11 wherein said image analysis system defines a candidate object contour stored in said circled-region data-structure and based on said connected pixels and further includes a feature extraction module to analyze said candidate object contour to identify said user-circled region, said image analysis system ignoring other circular shaped regions by applying at least one of the following techniques: size metric based elimination, half-tone based image elimination, circular distance function, square distance function and Manhattan distance function.

21. In a facsimile transmission system having an Internet E-mail transmission system, the improvement comprising:
   memory for storing a digitized image of at least one page of a document to be faxed;
   image analysis system for analyzing digitized image to identify a user-circled region and for extracting a portion of said digitized image that lies generally within said identified user-circled region, the extraction being performed by said image analysis system storing pixel information in a user-circled region and using at least one of a line adjacency determination algorithm and a candidate object contour recognition algorithm to determine said user-circled region, said image analysis system adapted to recognize only the user-circled region and to ignore other circular shaped regions;
   optical character recognition system for converting said extracted portion into characters; and
   address entry system for supplying an E-mail address to said facsimile system based on said characters.

22. A method of transmitting a facsimile via a fax machine, comprising the steps of:
   storing a digitized image of at least a first page of a document to be faxed;
   analyzing the digitized image to identify a user-circled region, the analysis being performed by using at least one of a line adjacency determination algorithm and a candidate object contour recognition algorithm to determine said user-circled region, said analysis adapted to recognize only the user circled region and ignoring other circular shaped regions;
   extracting a portion of the digitized image that lies generally within the identified user-circled region;
   converting the extracted portion into characters; and
   determining a dialing number based on the characters.

23. The method of claim 22 further comprising the step of:
   storing records of predetermined numbers associated with predetermined names or words; and
   wherein the step of determining further includes interacting with the stored records.

24. The method of claim 22 further comprising the steps of:
   generating a confidence value associated with each converted character; and generating an alert when a converted character has a low confidence value.

25. The method of claim 24 further comprising the step of providing a visual indication that a converted character has a low confidence value.

26. The method of claim 24 further comprising the step of providing an audible indication that a converted character has a low confidence value.

27. The method of claim 22 further comprising the step of providing an indication of the dialing number to a user.

28. The method of claim 27 wherein the step of providing an indication includes providing a visual indication of the dialing number.

29. The method of claim 27 wherein the step of providing an indication includes providing an audible indication of the dialing number.

30. The method of claim 22 wherein the step of analyzing using the line adjacency determination algorithm includes the steps of:

identifying connected pixels of a predetermined tone;

defining a line-adjacency graph based on the connected pixels;

ignoring other circular shaped regions by applying at least one of the following techniques: minimum size detection, rectangle frame detector and photographic element detection; and analyzing the line-adjacency graph to identify the user-circled region.

31. The method of claim 22 wherein the step of analyzing using the candidate object contour recognition algorithm includes the steps of:

identifying connected pixels of a predetermined tone;

defining a candidate object contour based on the connected pixels;

ignoring other circular shaped regions by applying at least one of the following techniques: size metric based elimination, half-tone based image elimination, circular distance function, square distance function and Manhattan distance function; and analyzing the candidate object contour to identify the user-circled region.

32. A method of transmitting a facsimile via a facsimile transmission system having an Internet E-mail transmission system, comprising the steps of:

storing a digitized image of at least one page of a document to be faxed; analyzing the digitized image to identify a user-circled region, the analysis being performed by using at least one of a line adjacency determination algorithm and a candidate object contour recognition algorithm to determine said user-circled region, said analysis adapted to recognize only the user circled region and ignore other circular regions;

extracting a portion of the digitized image that lies generally within the identified user-circled region;

converting the extracted position into characters; and determining an E-mail address based on the characters.

33. The method of claim 32 further comprising the steps of:

generating a confidence value associated with each converted character; and generating an alert when a converted character has a low confidence value.

34. The method of claim 32 further comprising the step of providing an indication of the E-mail address to a user.

* * * * *